United States Patent
Schwalenberg et al.

Patent Number: 6,062,319
Date of Patent: May 16, 2000

[54] TRACTOR ROCKSHAFT-ASSIST QUICK-ATTACH APPARATUS FOR BACKHOES AND LIKE IMPLEMENTS

[75] Inventors: Terry R. Schwalenberg, Rural Hilbert; Earl J. Halbach, Rural Elkhart Lake, both of Wis.

[73] Assignee: Amerequip Corporation, New Holstein, Wis.

[21] Appl. No.: 09/061,119

[22] Filed: Apr. 16, 1998

[51] Int. Cl.⁷ .............................. A01B 51/00; A01B 63/10
[52] U.S. Cl. .............................. 172/272; 414/686; 37/468
[58] Field of Search .................... 414/686, 786, 414/723; 172/272, 439, 448, 47, 273; 37/468, 231

[56] References Cited

U.S. PATENT DOCUMENTS

| | | | |
|---|---|---|---|
| 3,871,463 | 3/1975 | Geisthoff . | |
| 3,904,051 | 9/1975 | Tsuchiya et al. . | |
| 3,966,065 | 6/1976 | Jones | 172/439 X |
| 4,043,470 | 8/1977 | Pilch . | |
| 4,163,627 | 8/1979 | Schnittjer et al. | 414/686 |
| 4,355,945 | 10/1982 | Pilch | 414/686 |
| 4,986,722 | 1/1991 | Kaczmarczyk et al. | 172/272 X |
| 5,029,650 | 7/1991 | Smit | 172/272 X |
| 5,098,252 | 3/1992 | Sheesley et al. | 172/273 X |
| 5,303,790 | 4/1994 | Coleman | 172/272 X |
| 5,540,289 | 7/1996 | Hirooka et al. | 172/272 |
| 5,544,708 | 8/1996 | Braun | 172/272 |
| 5,546,683 | 8/1996 | Clark | 172/272 X |
| 5,692,855 | 12/1997 | Burton | 172/272 X |

*Primary Examiner*—Christopher J. Novosad
*Attorney, Agent, or Firm*—Henderson & Sturm LLP

[57] ABSTRACT

A rockshaft assist quick-attach apparatus for mounting a cantileverly supported implement, such as a backhoe, to a tractor, and also a method of using the tractor's rockshaft arms in conjunction with rockshaft arm receiving members, tractor brackets and implement mountable brackets to assist in attaching a cantileverly supported implement, such as a backhoe to the tractor. The apparatus comprising tractor brackets, rockshaft arm receiving members and implement mountable brackets. Wherein, when attaching the implement, the rockshaft arms are lowered to their down most position. The tractor is backed toward the implement until it is in close proximity and in substantial alignment fore and aft with the implement. The rockshaft arms are raised until the rockshaft arms engage the rockshaft arm receiving members. Further raising of the rockshaft arms causes upward movement of the implement. Further raising of the rockshaft arms causes sequential engagement of the implement mountable brackets with the tractor brackets until the implement and tractor brackets are transversely aligned to receive securing members, thus rigidly but detachably fixing the implement to the tractor.

32 Claims, 12 Drawing Sheets

TRACTOR ROCKSHAFT-ASSIST QUICK-ATTACH APPARATUS FOR BACKHOES AND LIKE IMPLEMENTS

CROSS-REFERENCE TO RELATED APPLICATIONS

Not applicable.

STATEMENT REGARDING FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates generally to quick-attach mechanisms for attaching implements to a tractor, and more particularly to using a tractor's rockshaft arms in conjunction with rockshaft arm receiving members and tractor and implement mountable brackets to lift the implement and securely but detachably fix and cantileverly support the implement from the tractor.

2. Description of the Related Art

A variety of implements are commonly mounted to conventional agricultural tractors, and are usually removable from the tractor to free the tractor for other uses. Therefore, it is necessary that such implements are easily connected and disconnected from the tractor. Light duty backhoes are one type of such implements.

It is known that many types of implements, including tractor-mounted backhoes, may be attached to a tractor's three-point hitch. Such three-point hitch mounted backhoes are described in U.S. Pat. Nos. 3,904,051 and 3,966,065. There are certain drawbacks associated with three-point hitch mounting systems. For example, three-point hitch mounted backhoes require certain devices such as sway chains or restraints to reduce lateral movement of the three point hitch system during operation. Additionally, a tie-down or diagonal member is required to prevent the backhoe from floating or raising on the three point hitch system during operation. Also, additional front mounted counterweights are needed to overcome the increased moment about the rear axle of the tractor due to the longer moment arm from the axle to the center of gravity of the backhoe on the three-point hitch. This need for more front mounted counterweights causes increased strain on the tractor frame and can overload the tractor's axles.

To overcome the drawbacks associated with three-point hitch mounted backhoes, alternative attaching methods were developed. One such alternative method most commonly used in the industry includes the apparatus, or variations thereof, disclosed in U.S. Pat. No. 4,163,627 (hereinafter the '627 patent). Although the method disclosed in the '627 patent, and variations thereof, are an improvement over the three-point hitch backhoe attachment method, the attaching process is still too difficult and time consuming, often requiring two persons, or if the operator is alone, repeated dismounts from the tractor by the operator to complete the attaching process.

The '627 patent, and variations thereof, involve the following steps: The tractor must be backed up toward the backhoe, which is normally blocked up or resting on the ground surface. The backhoe's stabilizer legs may be in the up or down position. As the tractor is being backed up, the driver must attempt to align the rear of the tractor with forwardly extended backhoe mounting arms; the wheels of the tractor straddling said mounting arms. The tractor must be backed close enough to the backhoe to attach the backhoe's hydraulic lines to the tractor. After the operator gets out of the tractor and attaches the hydraulic lines, the operator must stand behind the tractor and next to the backhoe to manipulate the backhoe's hydraulic levers to lower the backhoe's two stabilizer legs and backhoe bucket until the backhoe is resting essentially on only those three points.

If the tractor of the '627 patent is not perfectly aligned when initially backing up the tractor, the operator must climb back onto the tractor and back it up until it is in the proper position. After the tractor is repositioned the second time, the operator must again exit the tractor and position himself behind the tractor next to the backhoe. The operator must manipulate the backhoe levers to raise and/or lower the bucket and stabilizer legs until the backhoe mounting arms are in a position to be connected to the tractor frame. The manipulation of the backhoe to align the mounting arms with the tractor's mounting brackets is often a time consuming process regardless of how experienced the operator is.

As is evident from the above description, the current process of attaching a backhoe to a tractor is a time consuming and difficult process. If an assistant is not available to the operator during the attaching process, the operator must exit the tractor a number of times to attach the hydraulic lines, manipulate the backhoe, and align the tractor with the mounting arms to complete the attaching process. Consequently, there is a need in the industry for a method of attaching a backhoe, or any other implement that is cantileverly supported off the tractor, in which the operator can quickly and easily attach the implement without having to leave his seat during the attaching process.

BRIEF SUMMARY OF THE INVENTION

The present invention relates to a rockshaft assist quick-attach apparatus for mounting a cantileverly supported implement, such as a backhoe, to a tractor, and also a method of using the tractor's rockshaft arms in conjunction with rockshaft arm receiving members, tractor brackets and implement mountable brackets to assist in attaching a cantileverly supported implement, such as a backhoe, to a tractor.

The above identified apparatus and method include utilizing a tractor's rockshaft arms, wherein the rockshaft arms are arcuately movable upwardly and downwardly. The rockshaft arms may be of the type with transversely extended posts at the rearward ends of the arms, or the rockshaft arms may be of the type with clevis type yokes and removable pins at the rearward ends of the arms.

The quick-attach apparatus preferably comprises tractor mountable brackets, rockshaft arm receiving members and implement mountable brackets. When attaching the implement, the rockshaft arms are lowered to their down most position. The tractor is backed toward the implement until it is in close proximity and in substantial alignment fore and aft with the implement. The rockshaft arms are raised until the rockshaft arms engage the rockshaft arm receiving members. Further raising of the rockshaft arms causes upward movement of the implement. Further raising of the rockshaft arms causes sequential engagement of the implement mountable brackets with the tractor brackets until the implement and tractor brackets are transversely aligned for receiving securing members, thus rigidly but detachably fixing the implement to the tractor frame.

Therefore, it is an object of the present invention to mount rockshaft arm receiving members and brackets on an implement, then to utilize the tractor's rockshaft arms to lift the implement into position until the implement mountable brackets are mateably aligned and nested with tractor brackets, and then securely but detachably locking the implement to the rear of the tractor.

It is a further object of the present invention that the tractor brackets do not interfering with the tractor's three-point hitch system after the implement has been detached.

It is still a further object of the present invention to provide a method of attaching a cantileverly supported implement to a tractor without having to manipulate the implement during the attaching process.

It is still a further object of the present invention to provide a method of attaching a cantileverly supported implement to a tractor before having to attach the implement's hydraulic lines.

It is yet another object of the present invention to enable a single operator to quickly and efficiently attach a cantileverly supported implement to a tractor while the operator remains in his or her seat during the attaching process.

Other objects, advantages, and novel features of the present invention will become apparent from the following detailed description of the invention when considered in conjunction with the accompanying drawings.

DETAILED DESCRIPTION OF THE INVENTION

Referring now to the drawings wherein like reference numerals designate identical or corresponding parts throughout the several views, FIGS. 1 through 28 show the apparatus of the present invention depicted generally at (10). In FIGS. 1–4 the sequential steps involved in attaching a cantileverly supported implement (12), such as a backhoe, to a tractor (14) is illustrated using the apparatus (10) of the present invention. For better illustration purposes, the rear wheel of the tractor (14) has been removed and the rear axle (16) is shown in hatched cross section. Only the relevant portions of the invention (10) are shown in solid bold lines, the tractor (14) and implement (12) are shown in phantom lines.

It should be understood that although FIGS. 1–4 illustrate the apparatus (10) of the present invention being used for attaching a backhoe to a tractor (14), this is done for illustration purposes only and such illustrations should not be considered as limiting the scope of this invention. It should therefore be understood that the apparatus (10) of the present invention may be used for mounting any implement (12) such as, a weight box, a rock box, a salt or fertilizer spreader, material collection system, or any number of other implements designed to be securely but detachably fixed to and cantileverly supported by the tractor (14).

Figure 1:
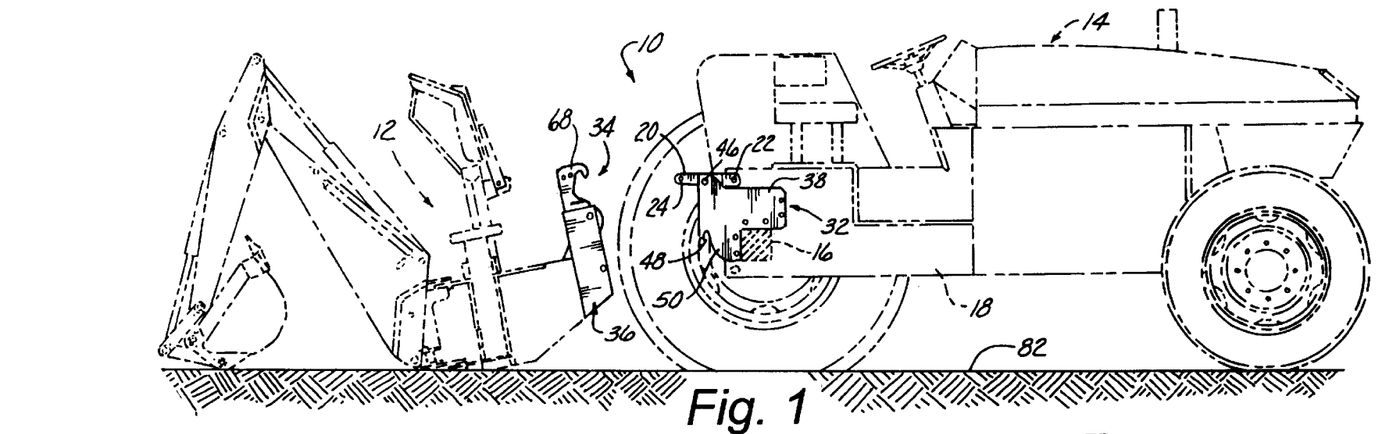
FIGS. 1 through 4 are side elevation views of a tractor and backhoe and illustrate the sequential steps of attaching the backhoe to a tractor using the apparatus of the present invention.
Figure 2:
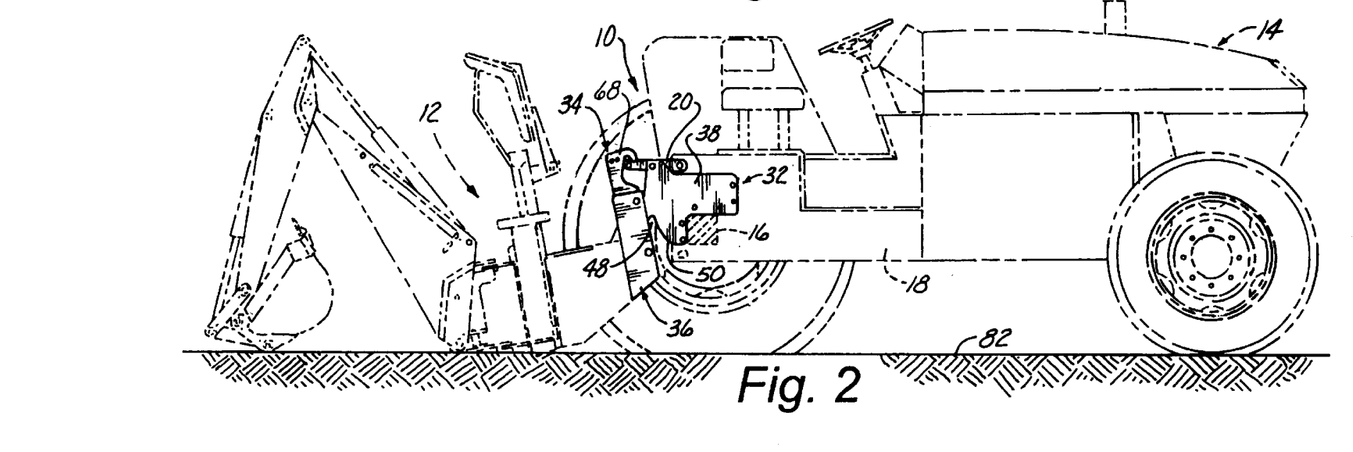
Figure 3:
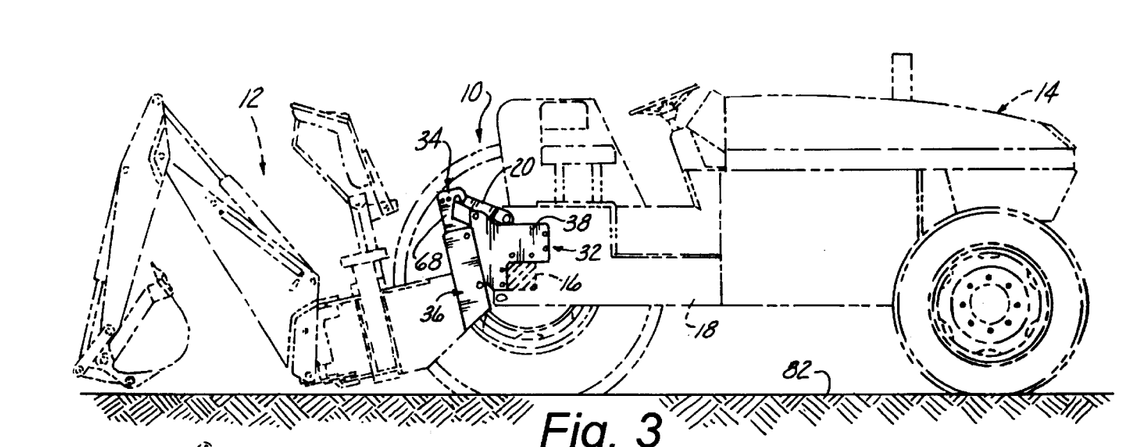
Figure 4:
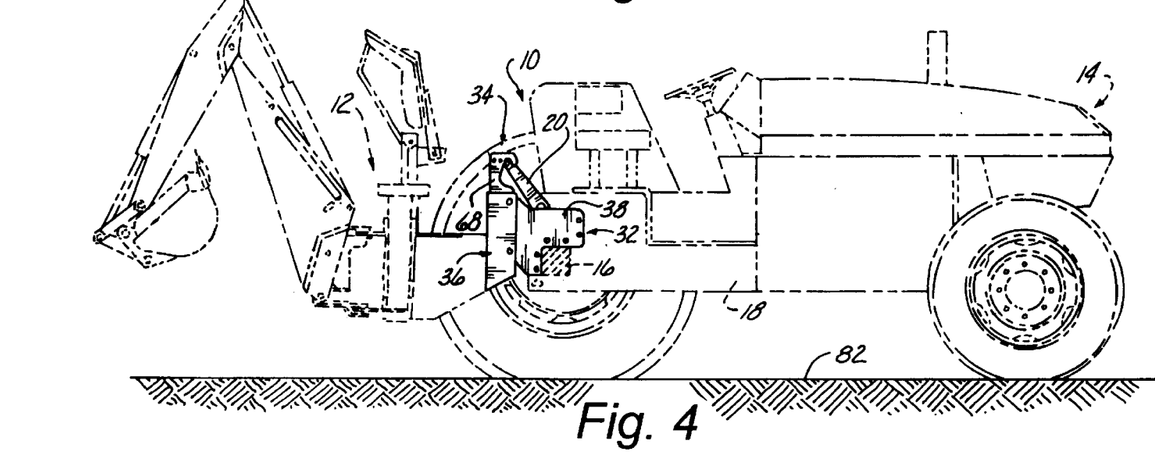
Figures 5, 6, 7:
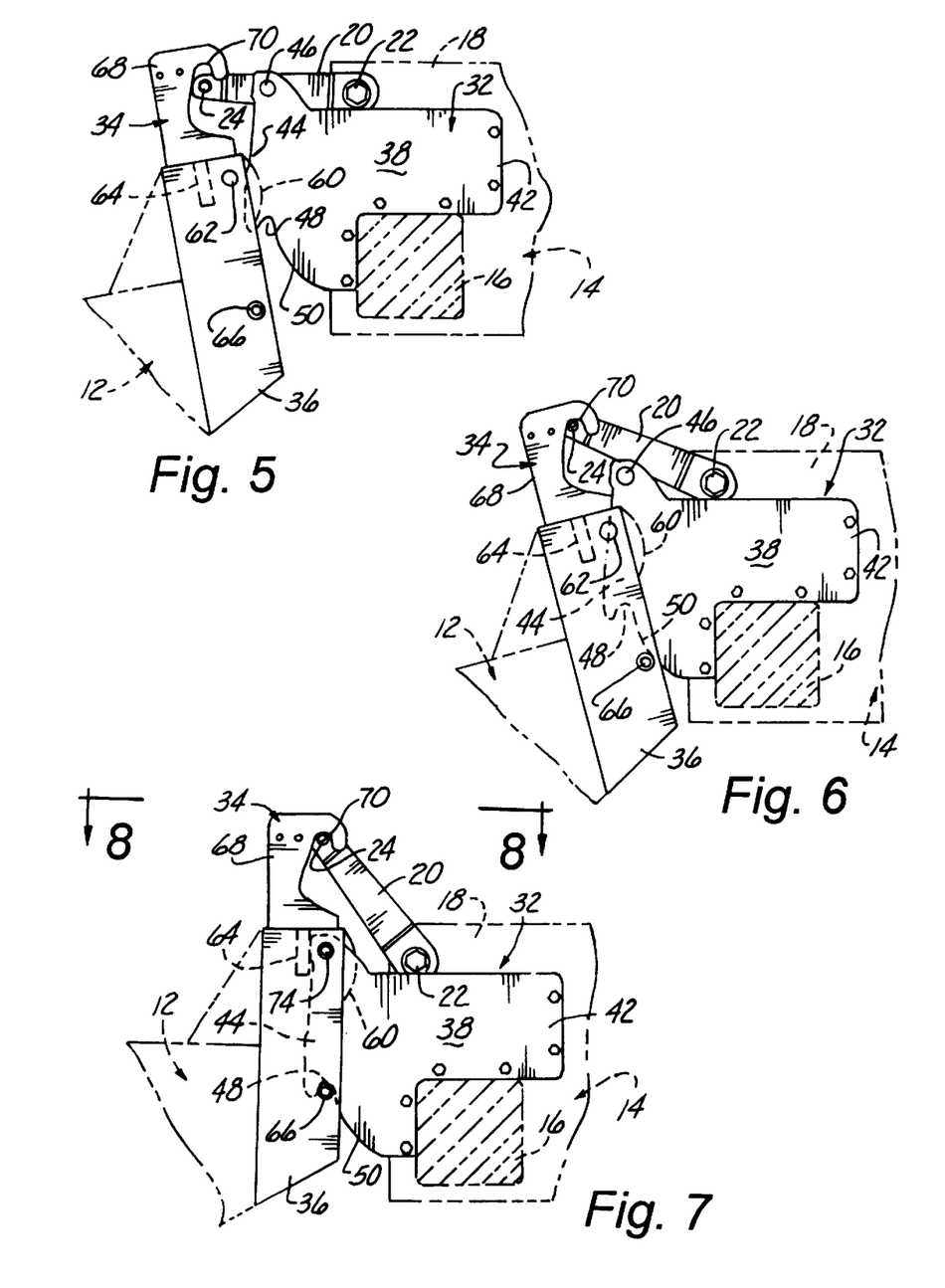
FIGS. 5 through 7 show a detailed view of the apparatus of the present invention involved in the sequential steps of FIGS. 2 through 4.
Figure 8:
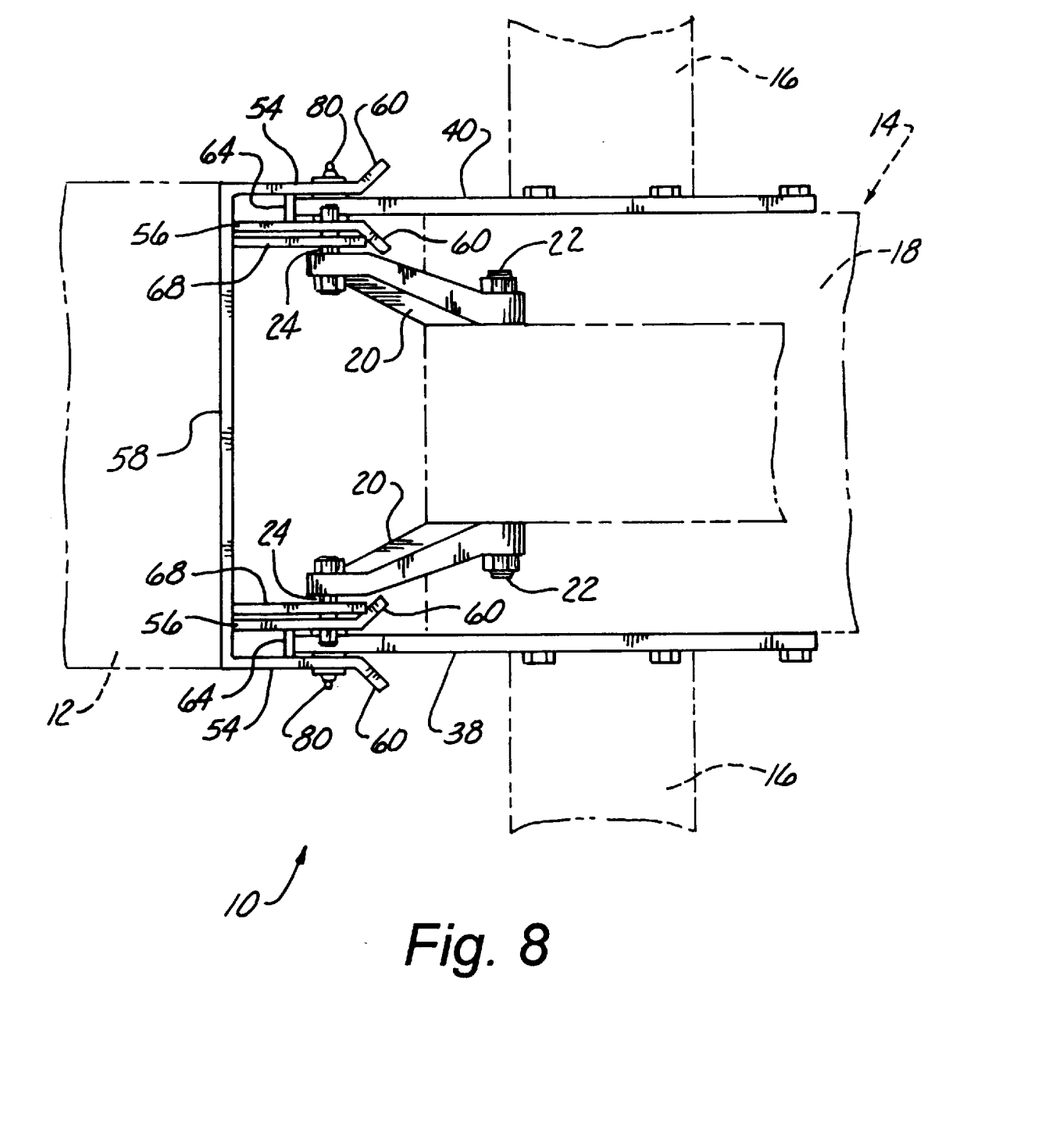
FIG. 8 is a plan view showing the apparatus of the present invention as viewed along lines 8—8 of FIG. 7.
Figures 9, 10, 11:
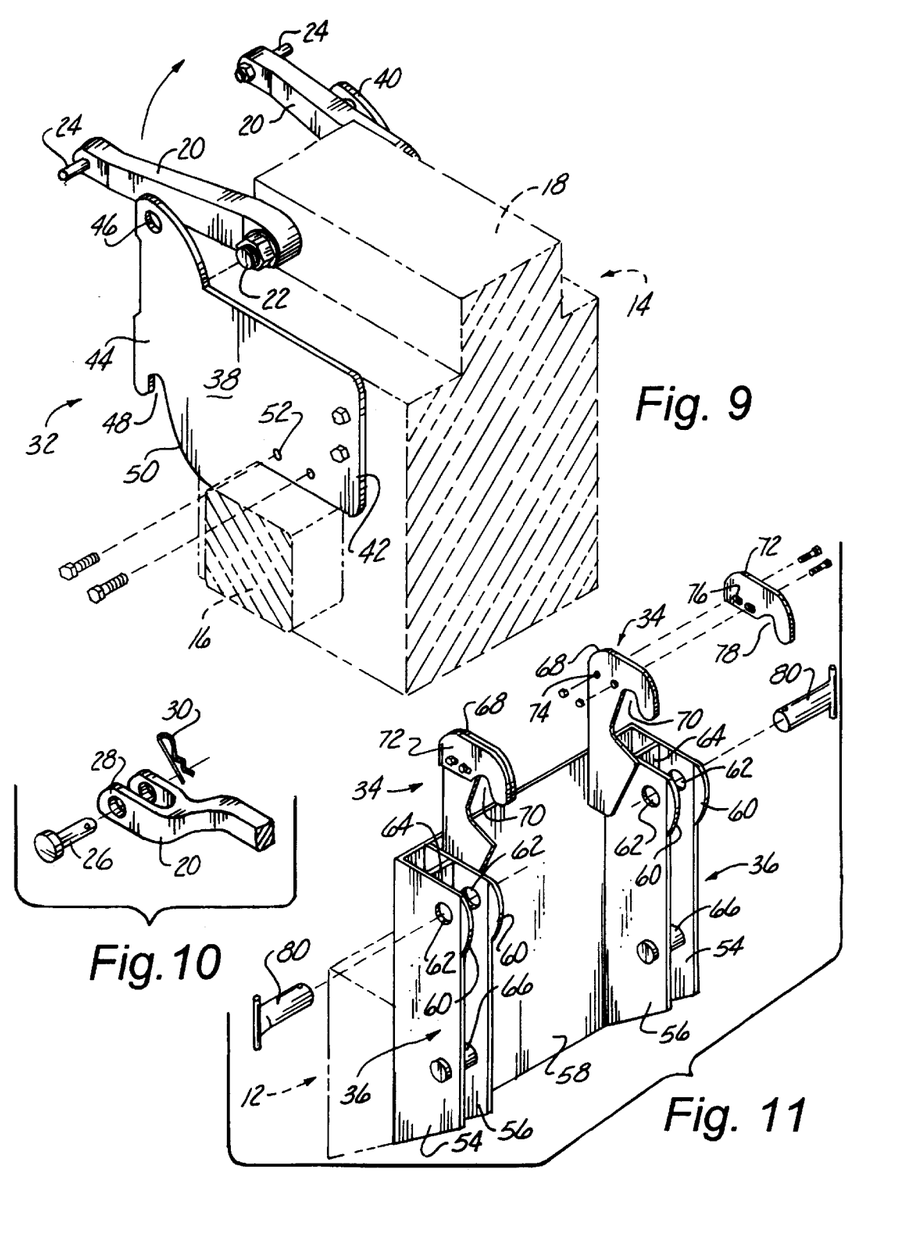
FIG. 9 is a perspective view of one embodiment of the tractor brackets of the present invention.
FIG. 10 is a perspective view of a rockshaft arm typically used on larger tractors.
FIG. 11 is a perspective view of one embodiment of the implement mountable brackets of the present invention.

FIGS. 5 through 7 are detail views of the apparatus (10) involved in the sequential steps of FIGS. 2 through 4. The tractor (14) has a main frame (18) and hydraulically powered rockshaft arms (20). Rockshaft arms (20) are common to all agricultural tractors (14) and are capable of moving arcuately upwardly and downwardly by rotation of the hydraulically powered rockshaft (22) housed within the frame (18) of the tractor (14). One typical type of rockshaft arm (20), found on smaller, lower horsepower tractors (14), is shown in FIG. 9. The FIG. 9 rockshaft arm (20) includes transversely aligned posts (24) fixed to the rearward ends of the arms (20). Another type of rockshaft arm (20), found on larger tractors (14) with more horsepower, is shown in FIG. 10. The FIG. 10 rockshaft arm (20) utilizes a pin (26) insertable into a clevis-type yoke (28) that is typically retained therein by a cotter pin (30). Therefore, when reference is made to the rockshaft arms (20) it should be understood that either type of rockshaft arm (20) of FIG. 9 or FIG. 10 is included. Likewise, when reference is made to rockshaft arm posts (24) of the FIG. 9 rockshaft arm, rockshaft arm pins (26) of the FIG. 10 rockshaft arm should be substituted if the FIG. 10 rockshaft arm is being used.

Figure 29:
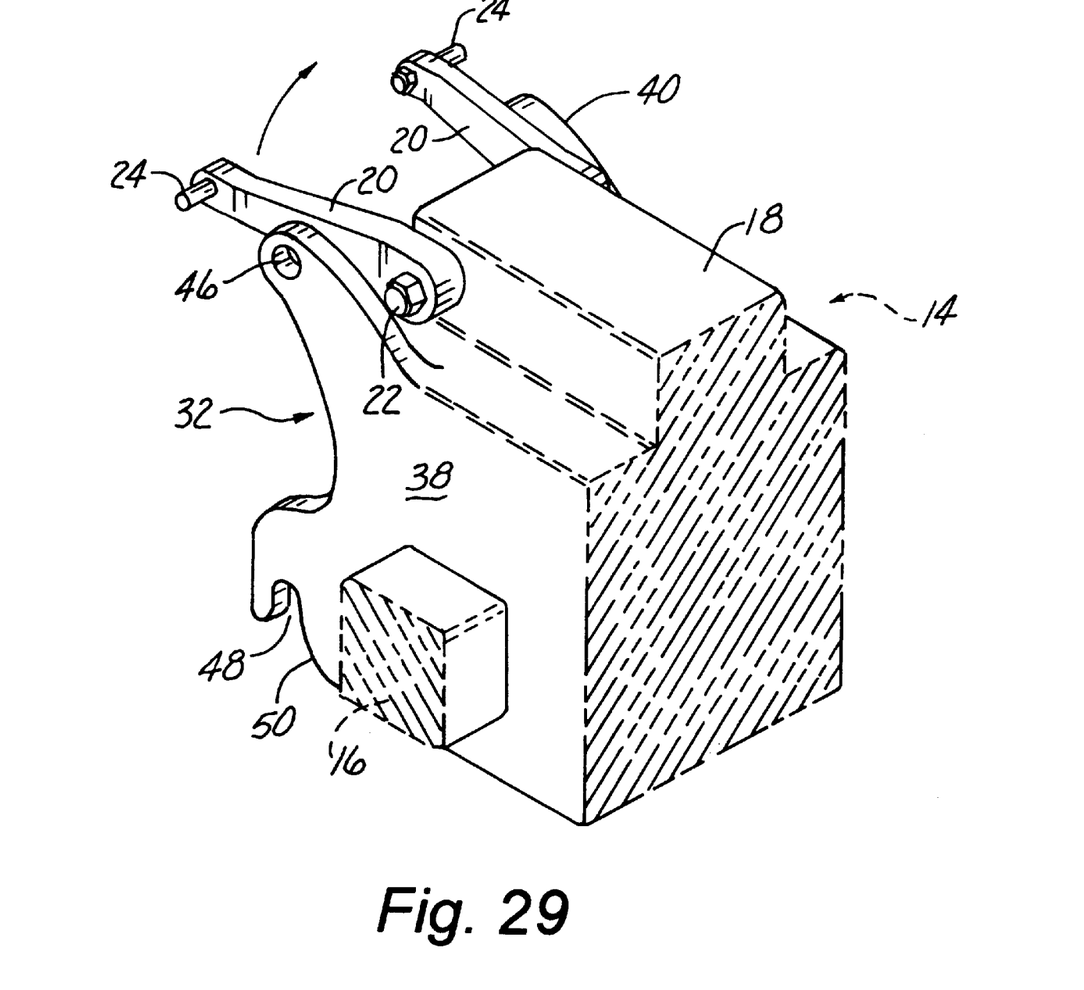
FIG. 29 is a perspective view of an alternate embodiment of the tractor brackets of FIG. 9, wherein the tractor brackets are cast integrally with the tractor frame.

The apparatus (10) is comprised of tractor brackets (32), rockshaft arm receiving members (34), and implement mountable brackets (36). In the preferred embodiment, shown in FIGS. 1–11, the tractor brackets (32) are comprised of transversely spaced apart, vertically disposed plates (38 and 40) (FIG. 9) each mountable on either side of the rear of the tractor adjacent the axle (16). In an alternate embodiment shown in FIG. 29, the tractor brackets (32) may be cast integrally with the tractor frame (18). Of course, in order to provide the embodiment shown in FIG. 29, the tractor brackets (32) must be provided for at the development and manufacturing stage of the tractor frame itself. Referring back to the preferred embodiment of FIG. 9, each plate (38 and 40) is a mirror image of the other and includes a forward portion (42) and a rearward portion (44). The rearward portion (44) includes an upper, transversely disposed, first passage (46), a lower, transversely disposed, inverted, U-shaped notch (48), and a lower, curved edge (50). The plates (38 and 40) are mounted in transversely spaced relation such that the passages (46), notches (48) and curved edges (50) are transversely aligned. It should be noted that the curvature of the edges (50) is convex relative to the axle (16) for reasons described hereinafter.

The actual shape of the plates (38 and 40) may vary depending on the make and model of the tractor (14) to which they are mounted. In the FIG. 9 illustration, the forward portion (42) of each plate (38 and 40) is bolted to the tractor frame (18) through apertures (52), positioned for alignment with apertures (not shown) in the tractor frame (18). Alternatively, the forward portion (42) may be welded to the tractor frame (18). The rearward portion (44) of each plate (38 and 40) extends rearwardly beyond the tractor frame (18) a sufficient distance such that the rear of the tractor frame (18) does not interfere with the implement mountable brackets (32) as the implement (12) is being attached.

It should be appreciated that the sizes and locations of the plates (38 and 40) and apertures (52) may vary depending on the make and model of the tractor (14) to which it is mounted. It should therefore be understood that the shape and location of apertures (52) (if any) of the forward portion (42) of each plate (38 and 40) is relevant to the present invention (10) only in that the forward portion (42) is designed to mate with the make and model of the tractor (14) to which it is mounted.

The rockshaft arm receiving members (34) and the implement mountable brackets (36) are rigidly secured to the implement (12). The method of securing the rockshaft arm receiving members (34) and the implement mountable brackets (36) to the implement (12) may be accomplished in any number of ways, including by welding or bolting.

In the preferred embodiment of FIG. 11, the implement mountable brackets (36) include a pair of forwardly projecting, transversely spaced, parallel flanges (54 and 56). The parallel flanges (54 and 56) are fixed to a mounting plate (58) for attachment to the implement (12) by welding or bolting. The parallel flanges (54 and 56) function as guides and may include outwardly flared ears (60) to assist in guiding and aligning the vertical plates (38 and 40) (FIG. 9) of the tractor brackets (32) with the implement mountable brackets (36) as the tractor (14) is backed into position. The flanges (54 and 56) include upper, transversely disposed, passages (62) (FIG. 10) for alignment with passage (46) (FIG. 9) in each plate (38 and 40) of the tractor brackets (32). Abutment plates (64) are positioned behind the passages (62) and between the parallel flanges (54 and 56) to further assist in alignment of the passages (62 and 46). Near the lower ends of each pair of parallel flanges (54 and 56) are transversely disposed lugs (66) for receiving notches (48) (FIG. 9) in plates (38 and 40) of the tractor brackets (32). It should be noted that the lugs (66) are generally aligned in a vertical plane with the passages (62).

The rockshaft arm receiving members (34) are comprised of a pair of planar hook elements (68) having inverted U-shaped cutouts (70) formed therein. The hooks (68) with cutouts (70) are disposed for receivably engaging the transversely disposed posts (24) (FIG. 9) of the rockshaft arms (20). In the FIG. 11 preferred embodiment, the hook elements (68) are fixed to the mounting plate (58) thereby forming a single assembly for mounting to the implement (12). It should be appreciated, however, that the rockshaft arm receiving members (34) may be secured to the implement (12) independently of the implement mountable brackets (36).

An additional element to the preferred embodiment of the present invention includes the use of aligning plates (72) which may be mounted to the upper hook elements (68) of rockshaft arm receiving members (34). As best viewed in FIG. 11, the hook elements (68) include apertures (74). These apertures (74) are positioned to align with elongated mating apertures (76) in the aligning plates (72). The aligning plates (72) include an inverted U-shaped cutout (78) having a narrower width than the U-shaped cutout (70) of the hook elements (68). The narrower U-shaped cutout (78) is of a dimension to receive the transverse post (24) of the rockshaft arm (20) with only a slight amount of clearance. By positioning and bolting the aligning plates (72) to the hook elements (68), the mating passages (62 and 46) of the implement mountable brackets (36) and the tractor brackets (32) are nearly perfectly aligned when the rockshaft arms (20) reach the top of their vertical arcs. Without the aligning plate (72), the rockshaft arms (20) may have to be more precisely manipulated in order to align the mating passages (62 and 46) to receive securing members (80) (FIG. 11).

In the attaching operation, with the implement (12) resting on a supporting surface (82) (FIG. 1) such as the ground, the tractor (14) is positioned such that the tractor frame (18) is aligned fore and aft with the implement (12). It will be noted in FIG. 1 that the tractor rockshaft arms (20) are lowered to their downward most position such that the transversely disposed posts (24) are lower or vertically below the hook elements (68) of the rockshaft arm receiving members (34). The tractor (14) is then backed rearwardly further toward the implement (12) (FIGS. 2 and 5) such that the rockshaft arm posts (24) are positioned within the inverted U-shaped cutouts (70) of the hook elements (68) and each vertical plate (38 and 40) is guided between the respective parallel flanges (54 and 56) (see FIG. 8).

The tractor operator then operates the tractor's conventional hydraulic system to effect a raising of the rockshaft arms (20) (FIG. 3 and 6) wherein the posts (24) of the rockshaft arms (20) engage the upper hook elements (68). As the rockshaft arms (20) are being raised, the implement (12) will tend to swing slightly toward the tractor (14) along an arc, pivoting about the horizontal axis of the transverse rockshaft posts (24) as the implement (12) is raised above the ground surface (82). The implement (12) will continue to swing toward the tractor (14) until the lower transverse lugs (66) of the implement mountable bracket (36) come in contact with the lower curved edges (50) of the vertical plates (38 and 40) as shown in FIG. 6.

Continued arcuate upward movement of the rockshaft arms (20) pulls the implement (12) upward and forward until it is off the ground surface (82) (FIG. 3). As the implement (12) is being raised, the lower transverse lugs (66) of the implement mountable bracket (36) slide up the curved edges (50) of the vertical plates (38 and 40) until the transverse lugs (66) are nested within the lower inverted U-shaped notches (48) of the vertical plates (38 and 40). With the transverse lugs (66) nested in the notches (48), further continued vertical movement of the rockshaft arms (20) causes the implement (12) to tilt forwardly about the horizontal axes of the nested transverse lugs (66) until the abutment plates (64) abut the upper rearward edges of the vertical plates (38 and 40) (FIG. 7). At this position, the passages (62) of the implement mountable brackets (36) are generally aligned with the passages (46) of the tractor brackets (32). The securing members (80) (FIG. 7) are then inserted into the aligned passages (62 and 46) by the operator, thereby rigidly securing the backhoe (12) to the tractor frame (18) while the operator remains in the tractor seat. If the tractor (14) is large, and the aligned passages (62 and 46) cannot be reached by the operator for insertion of the securing members (80) while the operator remains in his seat, the operator may be required to exit the tractor (14) to secure the implement (12) with the members (80). It should be appreciated, however, that even at this stage of the attaching process, the implement is securely and stablely supported by the rockshaft arms (20).

With the backhoe (12) securely fixed to the tractor frame (18) by the securing members (80, the operator may now exit the tractor (14) (if he has not already done so to insert the securing members (80)) to attach any necessary hydraulic lines (not shown) between the tractor (14) and the implement (12). It should be noted that once the securing members (80) are inserted through the aligned passages (62 and 46), the rockshaft arms (20) no longer carry any load. Thus, the rockshaft arms (20) only assist in raising the implement (12) during the attaching process until the implement (12) is secured in place by the securing members (80).

Detaching the backhoe implement (12) from the tractor (14), is simply accomplished by reversing the steps of the attaching process. After detaching the hydraulic lines (not shown) and removing the securing members (80), lowering of the rockshaft arms (20) results in the implement (12) pivoting slightly forwardly about the transverse rockshaft arm posts (24) as the lugs (66) (FIG. 6) slide downwardly along the curved edges (50) of the plates (38 and 40) until the implement (12) rests upon the ground (82) (FIG. 2). Continued lowering of the rockshaft arms (20) (FIG. 5) disengages the transverse rockshaft arm posts (24) from the inverted U-shaped cutouts (70) of the hook elements (68) such that the tractor (14) may then be moved away from the backhoe (12).

The apparatus (10) of the present invention has many advantages over the prior art. First, the backhoe (12) can be attached and removed faster and easier than previous attaching methods. Second, the implement (12) is stably supported by the rockshaft arms (20) before the operator must leave the tractor to connect the hydraulic lines. Third, a single operator can easily attach and remove the implement (12) without the assistance of another. Fourth, the solid frame tractor mountable brackets (32) protects the tractor (14), in that the implement (12) is not free to sway, unlike the three-point hitch mounting system discussed above. Fifth, the implement (12) feels more secure to the operator, than the prior art attachments, due to the rigid connection. Sixth, once the vertical plates (38 and 40) of the tractor brackets plates (32) are mounted to the tractor frame (18), the plates (38 and 40) never have to be removed, since the plates (38 and 40) are designed to enable the tractor's three-point hitch to be reinstalled without having to remove the plates (38 and 40). The plates (38 and 40) are also designed to avoid the sway chains commonly installed on three-point hitches (Note, this advantage also applies if the tractor brackets (32) are cast integrally with the tractor frame (18)). Seventh, because the implement (12) is closely supported off the rear of the tractor frame (18), less counterweight is required on the front of the tractor (14). Whereas, with implements (12) mounted on a tractor's three point hitch, the implement (12) is supported further away from rear of the tractor (14), causing a larger moment arm and thus more rotative force about the tractor's rear axle (16). Therefore, the farther away the implement (12) is supported from the rear of the tractor (14), the more counterweight is required at the front of the tractor (14) to counter the moment about the tractor's rear axle due to the implement's weight. The addition of counterweight can often overload the axles and damage the tractor (14).

Alternate Embodiment A

Figures 12, 13, 14, 15:
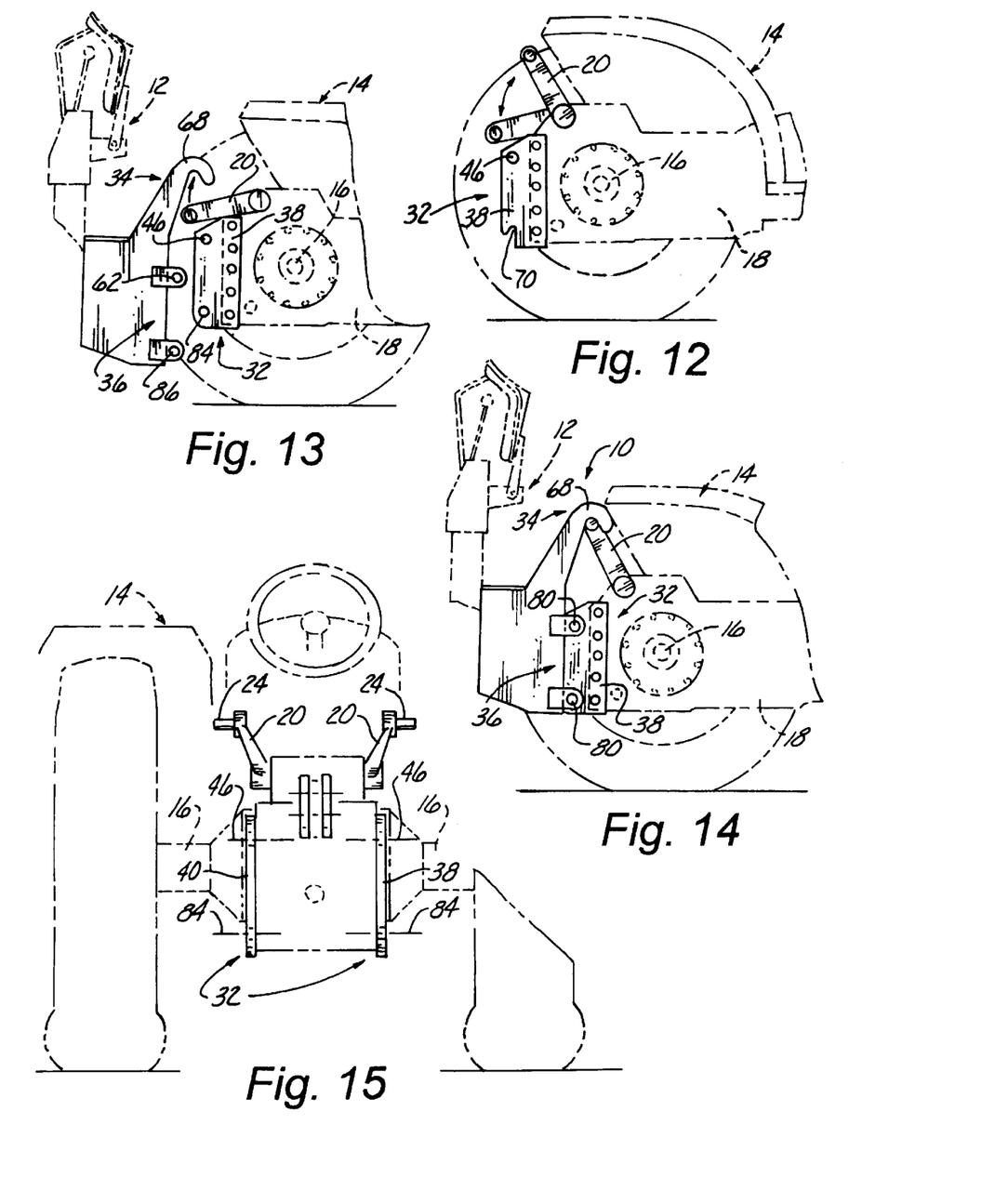
FIG. 12 is a side elevation view of another embodiment of the tractor brackets of the present invention.
FIG. 13 is a side elevation view of another embodiment of the tractor brackets and another embodiment of the implement mountable brackets of the present invention.
FIG. 14 is a side elevation view of the embodiments of FIG. 13 secured in final position.
FIG. 15 is a rear elevation view of the tractor brackets of FIG. 13.

An alternate embodiment of the apparatus (10) of the present invention is shown in FIG. 13. As can be seen from the figure, the apparatus (10) still includes tractor brackets (32), rockshaft arm receiving members (34) and implement mountable brackets (36). However, slight modifications are made to the brackets (32 and 36).

The tractor brackets (32) are still comprised of spaced apart vertical plates (38 and 40) (FIGS. 13 and 15), but rather than using an upper passage (46) and a lower transversely disposed notch (48) in the vertical plates (38 and 40), the vertical plates of the alternate embodiment utilize an upper transversely disposed first passage (46) and a lower transversely disposed second passage (84). Likewise, the implement mountable brackets (36) rather than using an upper passage (62) and a lower transverse lug (66) the alternate embodiment utilizes a set of upper transversely disposed third passages (62) and set of lower transversely disposed fourth passages (86). Whereas, as shown in FIG. 14, raising of the implement (12) by the rockshaft arms (20) effects alignment of the first and second passages (46 and 84) with said third and fourth passages (62 and 86) for insertion of the securing members (80).

Alternate Embodiment B

Figures 16, 17, 18:
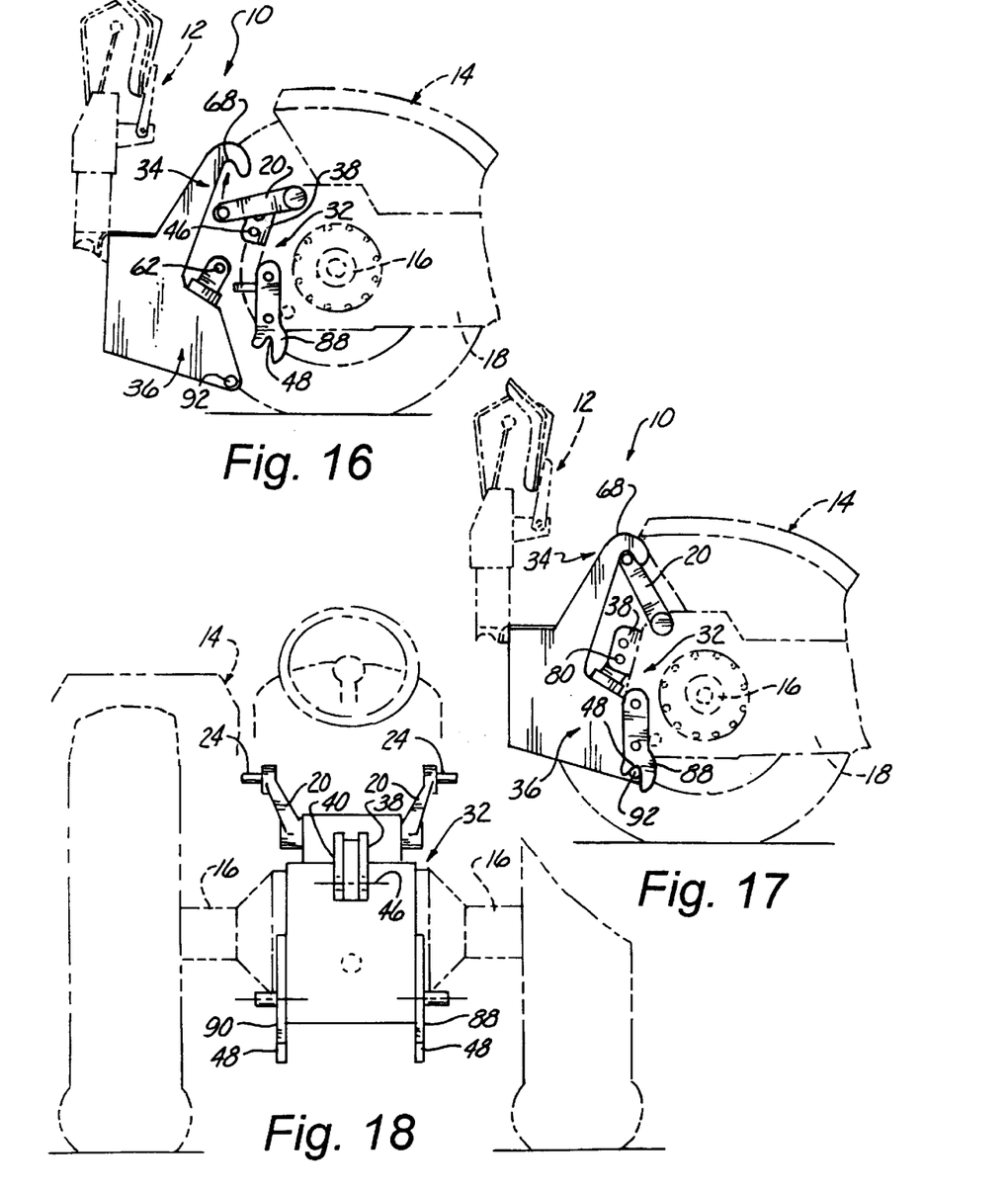
FIG. 16 is a side elevation view of another embodiment of the tractor brackets and another embodiment of the implement mountable brackets of the present invention.
FIG. 17 is a side elevation view of the embodiments of FIG. 16 secured in final position.
FIG. 18 is a rear elevation view of the tractor brackets of FIG. 16.

Yet another alternate embodiment of the apparatus (10) of the present invention is shown in FIG. 16. As can be seen from the figure, the apparatus (10) still includes tractor brackets (32), rockshaft arm receiving members (34) and implement mountable brackets (36). However, slight modifications are made to the brackets (32 and 36).

The tractor brackets (32) comprise a first set of transversely spaced apart plates (38 and 40) and a second pair of transversely spaced apart plates (88 and 90). The first set of spaced apart plates (38 and 40) (FIGS. 16 and 18) includes a first transversely disposed passage (46) and the second set of spaced apart plates (88 and 90) each include a lower transversely disposed notch (48). The implement mountable brackets (36) utilize an upper transversely disposed second passage (62) and lower transverse disposed posts (92). Whereas, as shown in FIG. 17, raising of the implement (12) by the rockshaft arms (20) effects engagement of said posts (92) with said transversely disposed notches (48) and whereby further raising of the implement (12) by the rockshaft arms (20) effects alignment of the first and second passages (46 and 62) for insertion of a securing pin (80).

Alternate Embodiment C

Figures 19, 20, 21:
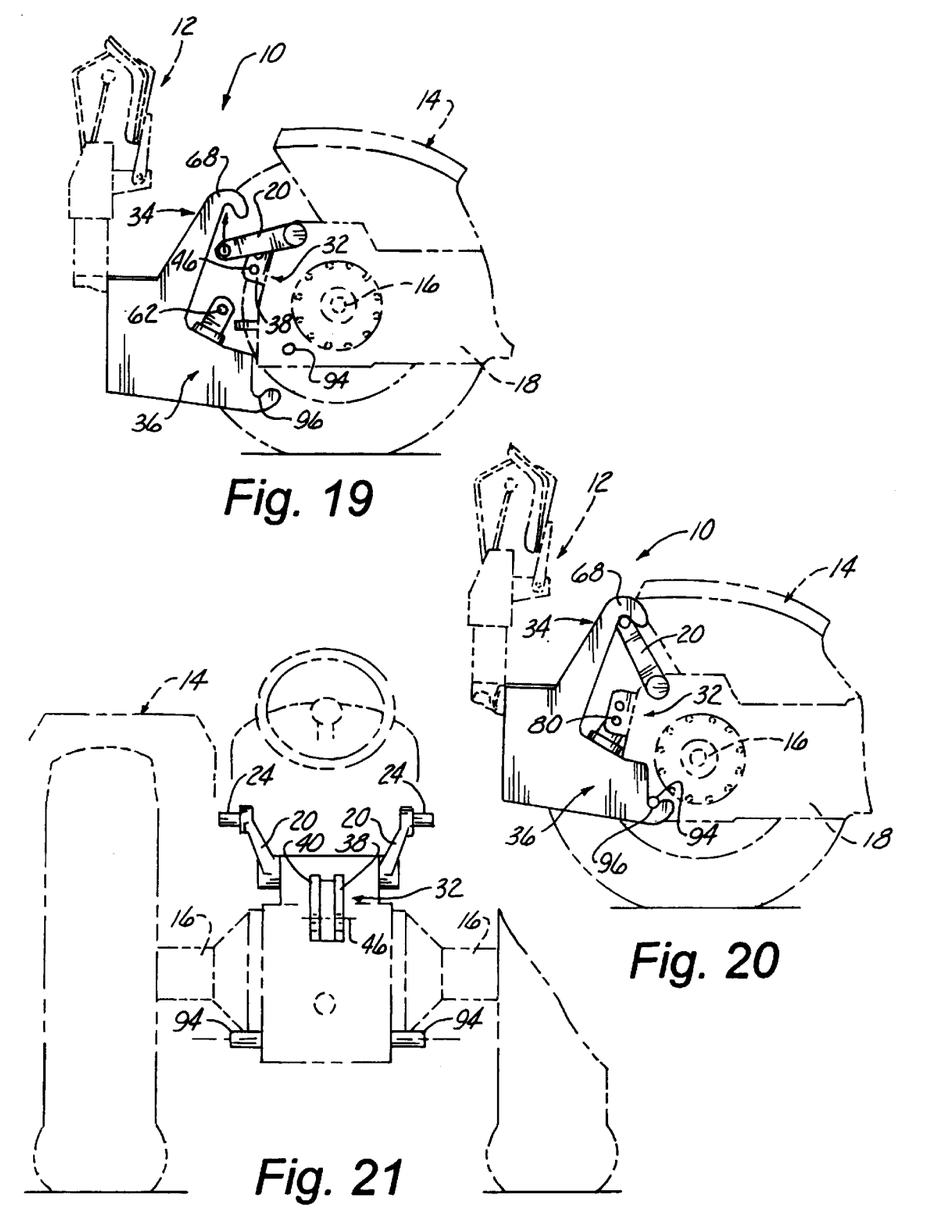
FIG. 19 is a side elevation view of another embodiment of the tractor brackets and another embodiment of the implement mountable brackets of the present invention.
FIG. 20 is a side elevation view of the embodiments of FIG. 19 secured in final position.
FIG. 21 is a rear elevation view of the tractor brackets of FIG. 19.

Yet another alternate embodiment of the apparatus (10) of the present invention is shown in FIG. 19. As can be seen from the figure, the apparatus (10) still includes tractor brackets (32), rockshaft arm receiving members (34) and implement mountable brackets (36). However, slight modifications are made to the brackets (32 and 36).

As shown in FIGS. 19 and 21, the tractor mountable brackets (32) comprise spaced apart plates (38 and 40) having a first transversely disposed first passage (46). The tractor brackets (32) further comprise a pair of transversely disposed posts (94). The transversely disposed posts (94) may be the same posts used for the lower links of the tractor's three-point hitch system now removed. The implement mountable brackets (36) utilize an upper transversely disposed second passage (62) and a pair of lower transverse notches (96). Whereas, as shown in FIG. 20, raising of the implement (12) by the rockshaft arms (20) effects engagement of said posts (94) with said transversely disposed notches (96) and whereby further raising of the implement (12) by the rockshaft arms (20) effects alignment of the first and second passages (46 and 62) for insertion of a securing pin (80).

Alternate Embodiment D

Figure 22:
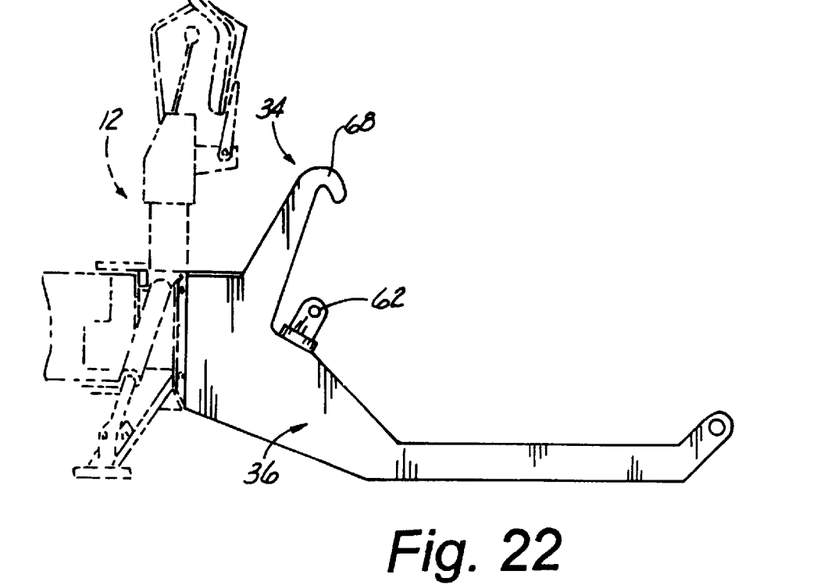
FIG. 22 is a side elevation view of another embodiment of the implement mountable brackets of the present invention.
Figure 23:
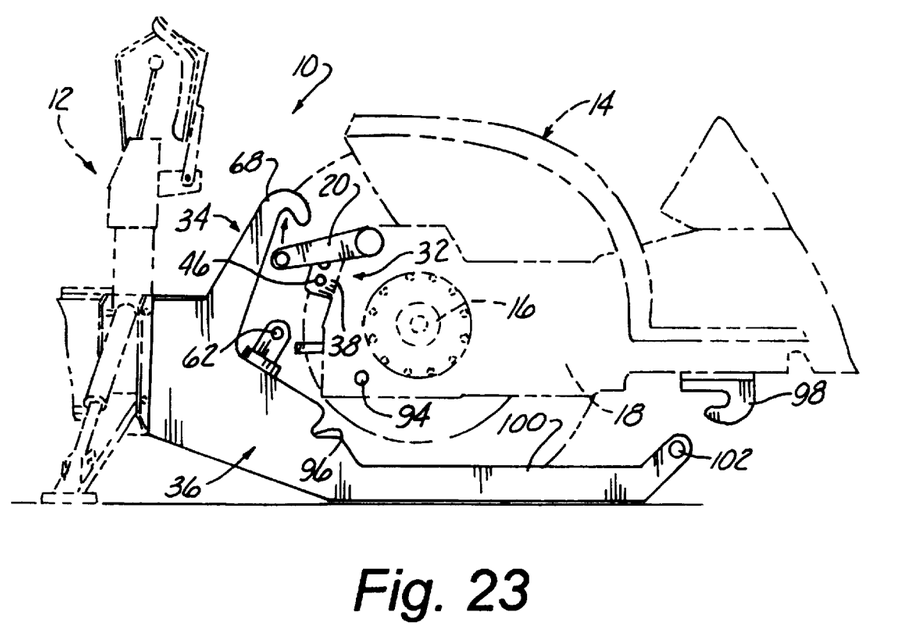
FIG. 23 is a side elevation view of another embodiment of the tractor brackets and another embodiment of the implement mountable brackets of the present invention.

Other alternate embodiments of the apparatus (10) of the present invention is shown in FIGS. 22 and 23. As can be seen from the figures, the apparatus (10) still includes tractor brackets (32), rockshaft arm receiving members (34) and implement mountable brackets (36). However, slight modifications are made to the brackets (32 and 36).

In FIG. 23, the tractor brackets (32) comprise spaced apart plates (38 and 40) having a first transversely disposed first passage (46). The tractor brackets (32) further comprise a pair of transversely disposed hooks (98) mountable below and forwardly on said tractor frame (18). The tractor brackets (32) may also further comprise a pair of transversely disposed first posts (94). If the embodiment of the implement mountable brackets (36) of FIG. 22 is used, the first posts (94) are not utilized. If the embodiment of the implement mountable brackets (36) of FIG. 23 is used, the first posts (94) are utilized. The transversely disposed first posts (94) may be the same posts used for the lower links of the tractor's three-point hitch system now removed.

Figure 24:
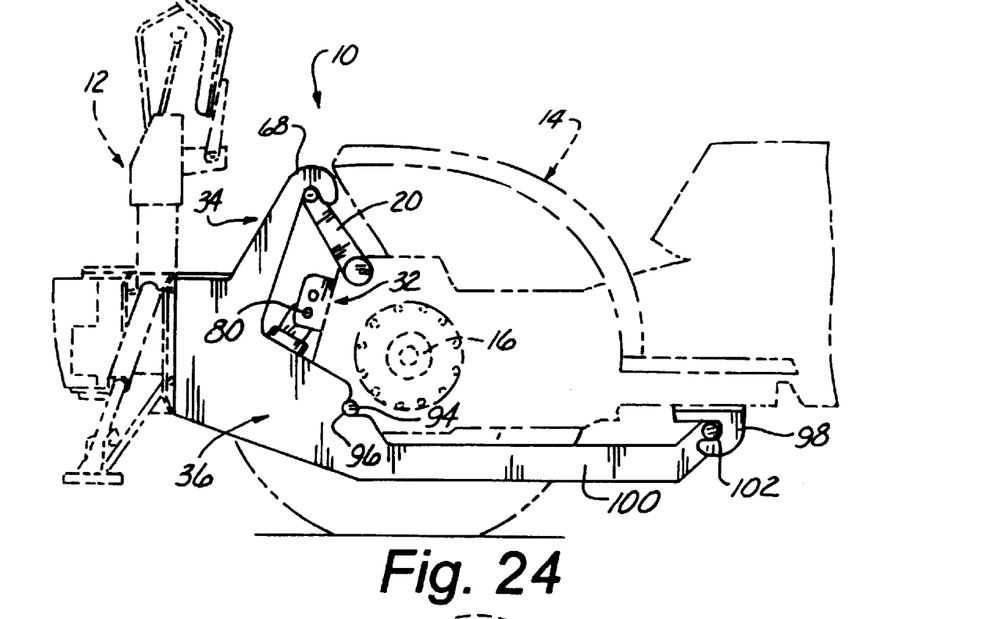
FIG. 24 is a side elevation view of the embodiments of FIG. 19 secured in final position.
Figure 25:
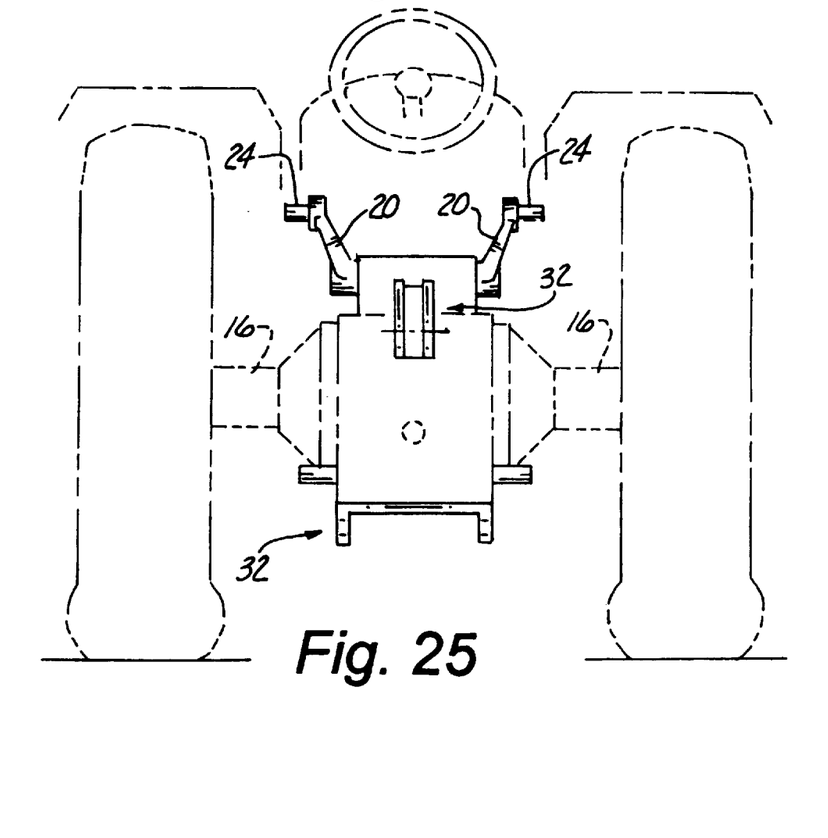
FIG. 25 is a rear elevation view of the tractor brackets of FIG. 19.

In FIGS. 22 and 23, the implement mountable brackets (36) utilize an upper transversely disposed second passage (62). The implement mountable brackets (36) also comprise a pair of forwardly extending arms (100) each having a transversely disposed second post (102) at its forward end. In the FIG. 23 embodiment, the implement mountable brackets (36) also include a pair of transverse notches (96). Whereas, as shown in FIG. 24, raising of the implement (12) by the rockshaft arms (20) effects engagement of the second posts (102) on said forwardly extending arms (100) with the forward transversely disposed hooks (98) and whereby further raising of the implement (12) by the rockshaft arms (20) effects engagement of said first posts (94) with the notches (96) and further raising of the implement (12) by the rockshaft arms (20) effects alignment of the first and second passages (46 and 62) for insertion of a securing pin (80). Obviously, if the FIG. 22 embodiment is being utilized, the notches (96) and first posts (94) are not present and do not engage.

Figure 26:
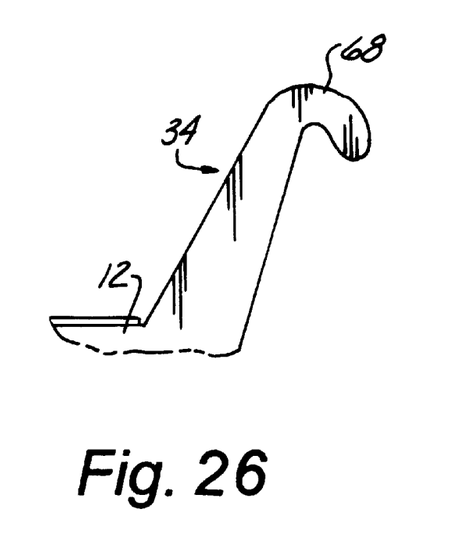
FIG. 26 is a side elevation view of another embodiment of the rockshaft arm receiving member of the present invention.
Figure 27:
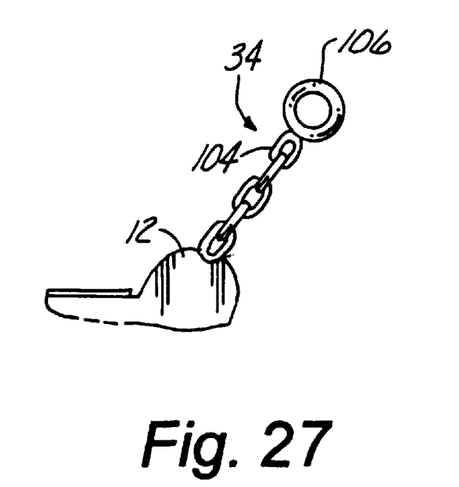
FIG. 27 is a side elevation view of another embodiment of the rockshaft arm receiving member of the present invention.
Figure 28:
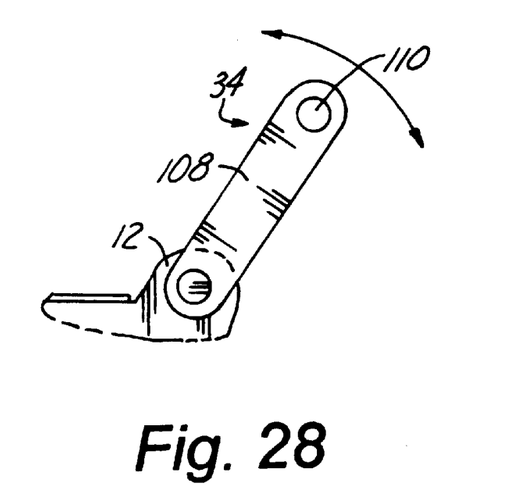
FIG. 28 is a side elevation view of another embodiment of the rockshaft arm receiving member of the present invention.

FIGS. 26, 27 and 28 illustrate alternate embodiments of the rockshaft arm receiving members (34). FIG. 26 illustrates a simple hook element (68), similar to the preferred embodiment best illustrated in FIG. 11. FIG. 27 shows a flexible element (104), such as a chain or cable, secured at one end to the implement (12) and having another end with an eyelet (106) for receiving the transverse pins (24) of the rockshaft arms (20). FIG. 28 shows a pivoting link (108), pivotally connected at one end to the implement (12) and having a passage (110) at another end for receiving the transverse pins (24) of the rockshaft arms (20).

Obviously many modifications and variations of the present invention are possible in light of the above teachings. It is therefore to be understood that, within the scope of the appended claims, the invention may be practiced otherwise than as specifically described.

What is claimed is:

1. An apparatus for attaching an implement to a tractor, the tractor having a main frame and a pair of rockshaft arms extending therefrom, the rockshaft arms being arcuately movable upwardly and downwardly, the apparatus comprising:

rockshaft arm receiving members mountable to said implement;

tractor brackets;

implement mountable brackets, wherein said implement mountable brackets receive said tractor brackets; and securing members for securing said implement mountable brackets to said tractor brackets such that the implement is securely but detachably fixed and cantileverly supported by the tractor;

whereby raising of said rockshaft arms engages said rockshaft arm receiving members causing upward movement of said implement, further raising of said rockshaft arms causing sequential engagement of said implement mountable brackets with said tractor brackets, said implement then being rigidly but detachably fixed to said tractor by said securing members.

2. The apparatus of claim 1 wherein said rockshaft arm receiving members include a fixed hook mountable to said implement.

3. The apparatus of claim 1 wherein said rockshaft arm receiving members includes a chain mountable to said implement.

4. The apparatus of claim 1 wherein said rockshaft arm receiving members include a cable mountable to said implement.

5. The apparatus of claim 1 wherein said rockshaft arm receiving members include a pivoting link mountable to said implement.

6. The apparatus of claim 1 wherein said tractor brackets comprise transversely spaced apart vertical plates, each of said spaced apart vertical plates including a transversely disposed notch and a transversely disposed first passage.

7. The apparatus of claim 6 wherein said tractor brackets are mountable to said tractor frame.

8. The apparatus of claim 6 wherein said tractor brackets are cast integrally with said tractor frame.

9. The apparatus of claim 6 wherein said implement mountable brackets comprise a pair of lower transversely disposed lugs and upper transversely disposed second passages, whereby raising of said implement by said rockshaft arms effects engagement of said lugs with said transversely disposed notches and whereby further raising of said implement by said rockshaft arms effects an alignment of said first and second passages for insertion of said securing members.

10. The apparatus of claim 1 wherein said tractor brackets comprise transversely spaced apart vertical plates, each of said spaced apart vertical plates including transversely disposed first and second passages.

11. The apparatus of claim 10 wherein said implement mountable brackets comprise a set of upper transversely disposed third passages, and a set of lower transversely disposed fourth passages, whereby raising of said implement by said rockshaft arms effects an alignment of said first and second passages with said third and fourth passages for insertion of said securing members.

12. The apparatus of claim 1 wherein said tractor brackets comprise first and second sets of transversely spaced apart plates, each of said first set of spaced apart plates including a transversely disposed first passage, and each of said second set of spaced apart plates including a transversely disposed notch.

13. The apparatus of claim 12 wherein said implement mountable brackets comprise a pair of transversely disposed posts and a transversely disposed second passage, whereby raising of said implement by said rockshaft arms effects engagement of said posts with said transversely disposed notches and whereby further raising of said implement by said rockshaft arms effects an alignment of said first and second passages for insertion of said securing members.

14. The apparatus of claim 1 wherein said tractor brackets comprise transversely spaced apart plates and a pair transversely disposed posts, each of said spaced apart plates including a transversely disposed first passage.

15. The apparatus of claim 14 wherein said implement mountable brackets comprise a pair of transversely disposed notches and a transversely disposed second passage, whereby raising of said implement by said rockshaft arms effects engagement of said posts with said transversely disposed notches and whereby further raising of said implement by said rockshaft arms effects an alignment of said first and second passages for insertion of said securing members.

16. The apparatus of claim 1 wherein said tractor brackets comprise transversely spaced apart plates and a pair of transversely disposed hooks mountable below and forwardly on said tractor frame, each of said spaced apart plates including a transversely disposed first passage.

17. The apparatus of claim 16 wherein said implement mountable brackets comprise a transversely disposed second passage and a pair of forwardly extending arms having transversely disposed second posts thereon, whereby raising of said implement by said rockshaft arms effects engagement of said second posts on said forwardly extending arms with said forward transversely disposed hooks and whereby further raising of said implement by said rockshaft arms effects an alignment of said first and second passages for insertion of said securing members.

18. The apparatus of claim 1 wherein said tractor brackets comprise transversely spaced apart plates, a first pair transversely disposed posts, and a pair of transversely disposed hooks mountable below and forwardly on said tractor frame, each of said spaced apart plates including a transversely disposed first passage.

19. The apparatus of claim 18 wherein said implement mountable brackets comprise a transversely disposed second passage, transversely disposed notches, and a pair of forwardly extending arms having transversely disposed second posts thereon, whereby raising of said implement by said rockshaft arms effects engagement of said second posts on said forwardly extending arms with said forward transversely disposed hooks and whereby further raising of said implement by said rockshaft arms effects engagement of said first posts with said notches and whereby further raising of said implement by said rockshaft arms effects an alignment of said first and second passages for insertion of said securing members.

20. A method of attaching an implement to a tractor, the tractor having a main frame and a pair of rockshaft arms extending therefrom, the rockshaft arms being arcuately movable upwardly and downwardly, the method comprising:

securing tractor brackets to said tractor frame;

securing rockshaft receiving members and implement mountable brackets to an implement, said implement being supported on a supporting surface;

positioning the tractor frame in close relation and substantial alignment fore and aft with the implement wherein said tractor brackets and implement mountable brackets are coextensively aligned longitudinally with each other, and with said rockshaft arms in their down most position;

raising of said rockshaft arms such that said rockshaft arms engage said rockshaft receiving members causing upward movement of said implement, further raising of said rockshaft arms causing sequential engagement of said implement mountable brackets with said tractor brackets; and securing said implement with securing members to said tractor brackets such that said implement is rigidly but detachably fixed to said tractor frame.

21. The method of claim 20 wherein said tractor brackets comprise transversely spaced apart vertical plates, each of said spaced apart vertical plates including a transversely disposed notch and a transversely disposed first passage.

22. The method of claim 21 wherein said implement mountable brackets comprise a pair of lower transversely disposed lugs and upper transversely disposed second passages, whereby raising of said implement by said rockshaft arms effects engagement of said lugs with said transversely disposed notches and whereby further raising of said implement by said rockshaft arms effects an alignment of said first and second passages for insertion of said securing members.

23. The method of claim 20 wherein said tractor brackets comprise transversely spaced apart vertical plates, each of said spaced apart vertical plates including transversely disposed first and second passages.

24. The method of claim 23 wherein said implement mountable brackets comprise a set of upper transversely disposed third passages, and a set of lower transversely disposed fourth passages, whereby raising of said implement by said rockshaft arms effects an alignment of said first and second passages with said third and fourth passages for insertion of said securing members.

25. The method of claim 20 wherein said tractor brackets comprise first and second sets of transversely spaced apart plates, each of said first set of spaced apart plates including a transversely disposed first passage, and each of said second set of spaced apart plates including a transversely disposed notch.

26. The method of claim 25 wherein said implement mountable brackets comprise a pair of transversely disposed posts and a transversely disposed second passage, whereby raising of said implement by said rockshaft arms effects engagement of said posts with said transversely disposed notches and whereby further raising of said implement by said rockshaft arms effects an alignment of said first and second passages for insertion of said securing members.

27. The method of claim 20 wherein said tractor brackets comprise transversely spaced apart plates and a pair transversely disposed posts, each of said spaced apart plates including a transversely disposed first passage.

28. The method of claim 27 wherein said implement mountable brackets comprise a pair of transversely disposed notches and a transversely disposed second passage, whereby raising of said implement by said rockshaft arms effects engagement of said posts with said transversely disposed notches and whereby further raising of said implement by said rockshaft arms effects an alignment of said first and second passages for insertion of said securing members.

29. The method of claim 20 wherein said tractor brackets comprise transversely spaced apart plates and a pair of transversely disposed hooks mountable below and forwardly on said tractor frame, each of said spaced apart plates including a transversely disposed first passage.

30. The method of claim 29 wherein said implement mountable brackets comprise a transversely disposed second passage and a pair of forwardly extending arms having transversely disposed second posts thereon, whereby raising of said implement by said rockshaft arms effects engagement of said second posts on said forwardly extending arms with said forward transversely disposed hooks and whereby further raising of said implement by said rockshaft arms effects an alignment of said first and second passages for insertion of said securing members.

31. The method of claim 20 wherein said tractor brackets comprise transversely spaced apart plates, a first pair transversely disposed posts, and a pair of transversely disposed hooks mountable below and forwardly on said tractor frame, each of said spaced apart plates including a transversely disposed first passage.

32. The method of claim 31 wherein said implement mountable brackets comprise a transversely disposed second passage, transversely disposed notches, and a pair of forwardly extending arms having transversely disposed second posts thereon, whereby raising of said implement by said rockshaft arms effects engagement of said second posts on said forwardly extending arms with said forward transversely disposed hooks and whereby further raising of said implement by said rockshaft arms effects engagement of said first posts with said notches and whereby further raising of said implement by said rockshaft arms effects an alignment of said first and second passages for insertion of said securing members.

* * * * *